Patented June 28, 1949

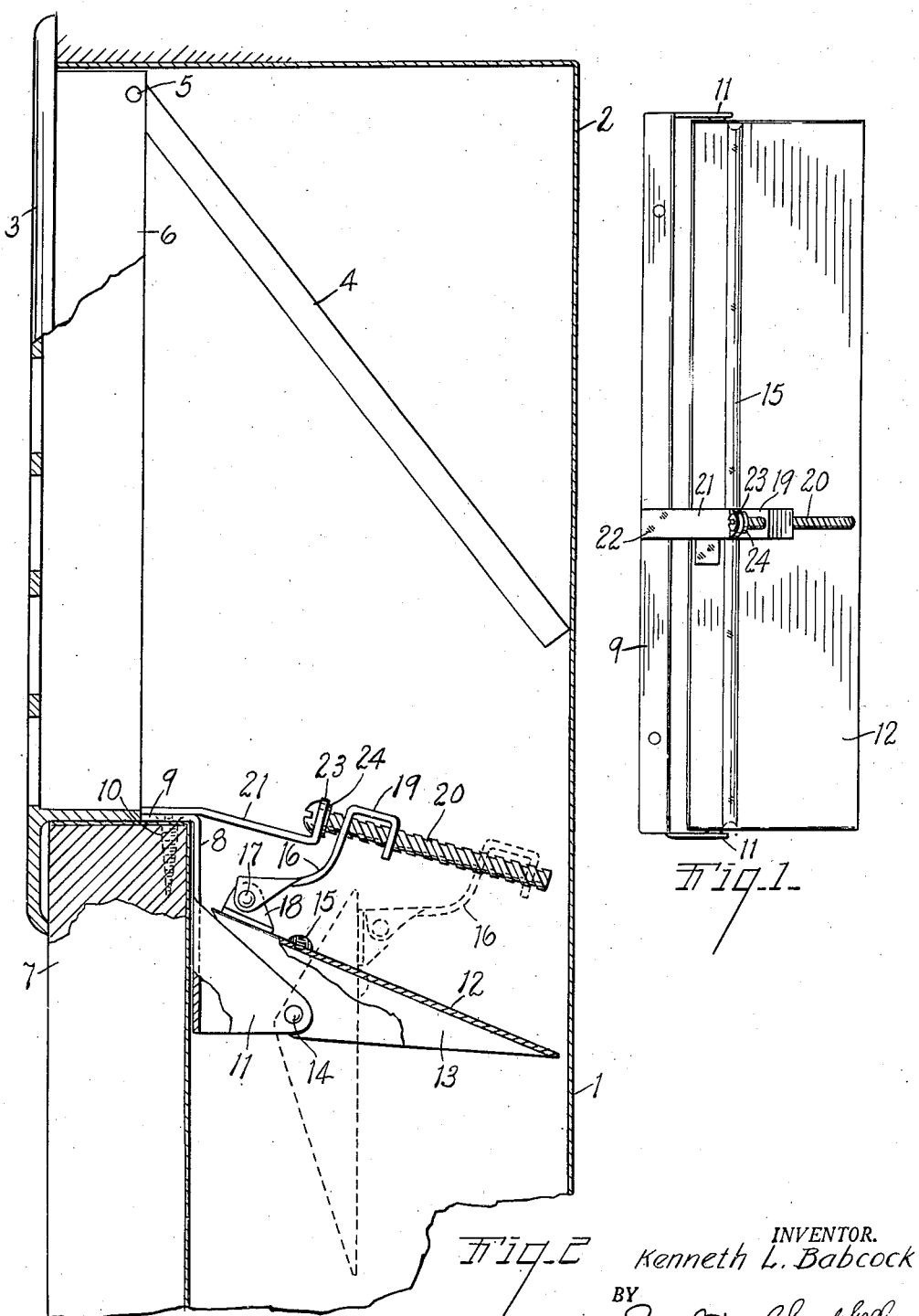

2,474,455

UNITED STATES PATENT OFFICE 2,474,455

AIR DUCT CONTROL

Kenneth L. Babcock, Muskegon, Mich., assignor to Air Control Products, Inc., Coopersville, Mich., a corporation of Michigan Application May 21, 1945, Serial No. 595,010

7 Claims. (Cl. 98—41)

This invention relates to improvements in air duct controls.

The main objects of this invention are:

First, to provide an air duct control for hot air and ventilating systems and the like which is assembled as a unit and may be easily installed in the conduit without modifying or changing the walls thereof.

Second, to provide an air control damper assembly in which the damper is supported within the duct or conduit so that it serves when partially opened to distribute the air delivered to the register or conduit head.

Third, to provide a structure which is quiet in operation and one in which the movable parts are subjected to spring stress preventing the rattling and oscillation thereof.

Objects pertaining to details and economies of the invention will definitely appear from the description to follow. The invention is defined in the claims.

A structure which embodies the features of the invention is clearly illustrated in the accompanying drawing, in which:

Fig. 1 is a plan view of a damper assembly embodying the invention, the damper being shown in closed position.

Fig. 2 is a fragmentary view partially in vertical section of my improved control damper assembled in a conduit and in operative relation to the register.

In the accompanying drawing 1 represents an air duct or conduit and 2 the stack head provided with a register 3. These parts are shown conventionally. A register damper 4 is provided, pivoted at 5 to the rearwardly projecting flanges 6 of the register. The register is set into suitable opening in the wall 7.

My damper assembly in the embodiment illustrated comprises a plate-like hanger 8 having a forwardly projecting flange 9 at the top thereof which laps upon the wall at the bottom of the register opening and is secured in position by screws 10. This hanger is formed as a sheet metal stamping and is provided with rearwardly projecting flange-like arms 11 at the ends thereof. The damper 12 is also a sheet metal stamping and is provided with downturned flange-like arms 13 at the ends thereof, these flanges being of triangular shape and pivoted at 14 to the arms 11. This arrangement locates the pivots substantially below the damper and in substantially spaced relation to the front edge thereof. When fully open the damper swings to a vertical position near the center of the duct or conduit as shown by dotted lines in Fig. 2. A reinforcing bar 15 is welded to the top of the damper, extending longitudinally across the same. A rib or corrugation might be substituted for the welded bar.

The link 16 is pivoted at 17 to the pivot ear 18 located on the front edge of the damper, the link extending rearwardly therefrom. The link terminates in a loop 19, the adjusting screw 20 engaging both arms of the loop so that the screw swings angularly with the link. The screw is carried by the arm 21 which is spot welded to the flange 10 as indicated conventionally at 22, the arm being provided with an upturned end 23 through which the screw extends, a collar 24 coacting with the head of the screw to prevent longitudinal movement of the screw. It will be noted that the screw thus constitutes an extension for the arm. The arm 21 is relatively rigid while the link 16 is designed to spring or yield, maintaining the parts under spring stress, preventing rattling in all positions, there being some spring stress on the parts when they are assembled. The arm 21 might constitute the spring element with substantially the same results.

With this arrangement, it is not necessary to hinge or pivot the damper to the stack or head; the parts are assembled as a unit and it is only necessary to secure the hanger to some suitable part of the structure. In the embodiment illustrated the pivots 14 are located substantially at the rear, spaced from the front and preferably about one-third the width of the damper. This results in a scoop-like action distributing the air over both sides of the stack head and resulting in good distribution over the face of the register. The structure is quiet in action and even where air is under considerable pressure there is substantially no noise resulting from flow of the air over the damper, and the parts are under spring stress in all positions so that vibration and rattling are minimized.

I have illustrated and described a desirable commercial embodiment of the invention. I have not attempted to illustrate or describe other embodiments as it is believed this disclosure will enable those skilled in the art to embody or adapt my invention as may be desired.

Having thus described my invention, what I claim as new and desire to secure by Letters Patent, is:

1. The combination with a wall register and a conduit of rectangular section operatively associated therewith, of a plate-like damper hanger provided with rearwardly projecting arms at its ends and having an out-turned flange at its upper edge adapted for attachment to a supporting part at the front of the conduit, a damper having downturned flanges of substantial width at the ends thereof pivotally mounted adjacent their lower edges on said hanger arms, the pivots being substantially spaced from the front edge of the damper, a pivot ear on the upper side of said damper adjacent the front edge thereof, a rearwardly projecting link pivotally mounted at its forward end on said ear and having a loop at its swinging end, an adjusting screw having threaded engagement with the arms of said loop whereby the screw is supported against angular movement relative to the link, and a supporting arm on which said screw is mounted to permit rotation thereof and to prevent angular movement relative to the arm, said arm being fixed at one end to the supporting flange of said hanger, said link being springable whereby the movable parts are subjected to spring stress, the parts being carried by said hanger permitting their assembly within the conduit as a unit.

2. A control assembly for air conduits comprising a hanger adapted for mounting to depend within the conduit and provided with rearwardly projecting flanges at its ends, a damper having downturned flanges of substantial width at the ends thereof pivotally mounted adjacent their lower edges on said hanger flanges, the pivots being substantially spaced from the front edge of the damper, a link pivotally connected to said damper and having a loop at its swinging end, an adjusting screw having threaded engagement with the arms of the loop whereby the screw is supported against angular movement relative to the link to swing therewith, and a supporting arm on which said screw is rotatably mounted for angular movement with the arm, said arm being fixed at one end to said hanger so that the movable parts are subjected to spring stress, the parts being carried by the hanger permitting their assembly within the conduit as a unit.

3. A control assembly for air conduits comprising a support adapted for mounting within a conduit and provided with rearwardly projecting flanges at its ends, a damper having flanges of substantial width at the ends thereof pivotally mounted adjacent their lower edges on said support flanges, the pivots being substantially spaced from the front edge of the damper, a link pivotally connected to said damper, an adjusting screw having engagement with the swinging end of the link for angular movement therewith, and a supporting arm on which said screw is mounted for angular movement therewith, said arm being fixed at one end to said support so that the movable parts are subjected to spring stress.

4. A control for air conduits comprising a hanger adapted for mounting within the conduit at one side thereof and provided with projecting arms at its ends, a damper having arms at its ends pivotally mounted on said hanger arms, the pivots being substantially spaced from the front edge of the damper, a springable link pivotally connected to said damper, an adjusting screw having threaded engagement with the link the engagement between said screw and link preventing relative angular movement therebetween, and a support for said screw, said screw being rotatable on said support and being retained against longitudinal movement relative to said support, said link being bodily supported solely by said screw and said damper.

5. A control for air conduits comprising a hanger adapted for mounting within the conduit, a damper pivotally mounted on said hanger, a link member pivotally connected to said damper, an adjusting screw having threaded engagement with the link, and a support member for said screw, said screw being rotatable on said support member and being retained against longitudinal movement relative to said support, said link being bodily supported solely by said screw and said damper, one of said members being springable to permit rotation of said damper relative to said support.

6. A control for air conduits comprising a hanger adapted for mounting within the conduit at one side thereof and provided with projecting arms at its ends, a damper having arms at its ends pivotally mounted on said hanger arms, the pivots being substantially spaced from the front edge of the damper, a link pivotally connected at one end to said damper and having a screw threaded opening through its other end, an adjusting screw having threaded engagement in the screw threaded opening in the link, said link being bodily supported solely by said damper and said screw, and means for supporting said screw on said hanger.

7. A control for air conduits comprising a hanger adapted for mounting within the conduit, a damper pivotally mounted on said hanger, a link pivotally connected at one end to said damper and having a screw threaded opening through its other end, an adjusting screw having threaded engagement in the screw threaded opening in the link, and a support for said screw, said screw being rotatable on said support, said link being bodily supported solely by said damper and said screw, said support being supportedly connected to said hanger.

KENNETH L. BABCOCK.

REFERENCES CITED

The following references are of record in the file of this patent:

UNITED STATES PATENTS

| Number | Name | Date |
|---|---|---|
| 964,597 | Wilson | July 19, 1910 |
| 1,063,645 | Boles | June 3, 1913 |
| 2,107,386 | Otto | Feb. 8, 1938 |
| 2,179,707 | Bernhardt | Nov. 14, 1939 |
| 2,203,120 | Young | June 4, 1940 |
| 2,255,616 | Heasley et al. | Sept. 9, 1941 |
| 2,284,912 | Maynard et al. | June 2, 1942 |
| 2,397,672 | Leigh | Apr. 2, 1946 |

FOREIGN PATENTS

| Number | Country | Date |
|---|---|---|
| 61,525 | Norway | Oct. 9, 1939 |